(12) United States Patent
McPheeters

(10) Patent No.: US 9,528,725 B2
(45) Date of Patent: Dec. 27, 2016

(54) SOLAR PANEL FRAME CLAMPS MOUNTING A SOLAR PANEL FRAME TO A PURLIN

(71) Applicant: Mainstream Energy Corporation, San Luis Obispo, CA (US)

(72) Inventor: Greg McPheeters, Santa Clara, CA (US)

(73) Assignee: Sunrun South LLC, San Luis Obispo, CA (US)

( * ) Notice: Subject to any disclaimer, the term of this patent is extended or adjusted under 35 U.S.C. 154(b) by 46 days.

(21) Appl. No.: 14/019,970

(22) Filed: Sep. 6, 2013

(65) Prior Publication Data

US 2014/0069877 A1 Mar. 13, 2014

Related U.S. Application Data

(60) Provisional application No. 61/698,989, filed on Sep. 10, 2012.

(51) Int. Cl.
*F24J 2/52* (2006.01)
*F16B 2/06* (2006.01)
*H01L 31/042* (2014.01)
*F16B 1/00* (2006.01)

(52) U.S. Cl.
CPC .............. *F24J 2/5258* (2013.01); *F16B 2/065* (2013.01); *F24J 2/5205* (2013.01); *F24J 2/5211* (2013.01); *F24J 2/5245* (2013.01); *F24J 2/5254* (2013.01); *H02S 20/00* (2013.01); *F16B 2001/0064* (2013.01); *Y02E 10/47* (2013.01); *Y02E 10/50* (2013.01); *Y10T 24/44974* (2015.01); *Y10T 29/49* (2015.01)

(58) Field of Classification Search
CPC .. F16B 2/065; F16B 2001/0064; F24J 2/5205; F24J 2/5211; F24J 2/5245; F24J 2/5254; F24J 2/5258; H02S 20/00; Y02E 10/47
USPC .. 24/569, 486, 706.01, 453, 706.1; 269/203, 143, 249; D8/73, 74, 394
See application file for complete search history.

(56) References Cited

U.S. PATENT DOCUMENTS

| | | | |
|---|---|---|---|
| 7,988,464 B2 * | 8/2011 | Kossak et al. | 439/92 |
| 8,495,997 B1 * | 7/2013 | Laubach | 126/680 |
| 2003/0070368 A1 * | 4/2003 | Shingleton | 52/173.3 |
| 2012/0090139 A1 * | 4/2012 | Scoggins et al. | 24/456 |

* cited by examiner

Primary Examiner — Michael Safavi
(74) Attorney, Agent, or Firm — Kramer Levin Naftalis & Frankel LLP

(57) ABSTRACT

Solar panel frame clamps are disclosed. The clamps can include a clamp body for coupling together a mounting rail of a solar panel frame and a purlin. The clamp body may be c-shaped with ends of the clamp body defining an opening for receiving objects to be clamped. The ends of the clamp body may be provided with threaded apertures for receiving a set screw and a set screw bolt. Tightening the set screw bolt can pull the clamp body towards the objects to be clamped. The set screw, or another suitable feature, may contact the clamped object to facilitate electrical continuity throughout a system incorporating the solar panel frame clamps.

11 Claims, 8 Drawing Sheets

SOLAR PANEL FRAME CLAMPS MOUNTING A SOLAR PANEL FRAME TO A PURLIN

BACKGROUND

Solar cell panels (also referred to as solar cell modules) are an increasingly popular means of generating renewable power, and recently there has been a wide proliferation of solar projects of all sizes, from small residential installations to large utility scale power production. Current solar cell panels are typically composed of photovoltaic solar cells encased in a rigid supporting frame. When installed, these solar cell panels can be supported by a racking system.

A significant cost associated with solar power projects arises from paying a trained installer to set up a racking assembly and attach solar panels to the assembly. Solar panels are typically attached to racking systems using a complicated multi-step process involving grounding conductors and clamps and/or bolts, which incurs significant labor and material cost. Reducing the number of components and labor required to install solar panels can drastically reduce installation costs.

SUMMARY

Solar panel frame clamps ("frame clamps") and systems incorporating the same are disclosed. The frame clamps disclosed herein may include a clamp body a threaded aperture provided at each end of the clamp. A first threaded aperture can be configured to threadably receive a set screw, and a second threaded aperture can be configured to threadably receive a set screw bolt. The set screw can contact a mounting rail that supports one or more solar panel frames to provide electrical continuity throughout a solar panel racking system. The set screw bolt may engage a purlin (or other suitable rail) to clamp the mounting rail to the purlin. The clamp body may be c-shaped, thus including an opening between its two ends configured to receive the mounting rail and the purlin.

Solar power installations incorporating the frame clamps disclosed herein may include a series of posts interconnected by one or more purlins. The frame clamps can fasten a series of mounting rails to the purlins such that the mounting rails span from a first row to a second row of purlins. According to various embodiments, the mounting rails may form part of the solar panel frame or may be separate members to which the solar panels may be mounted. Electrical continuity may be established from the solar cells to the frame of the solar panel, via the set screw to the mounting rail and clamp body, then via the set screw bolt to the purlin, and from the purlin to the posts and/or a local or common ground.

BRIEF DESCRIPTION OF THE DRAWINGS

The above and other objects and advantages of the invention will be apparent upon consideration of the following detailed description, taken in conjunction with the accompanying figures, in which like reference characters refer to like parts throughout, and in which.

DETAILED DESCRIPTION

Reference will now be made in detail to the embodiments of the present invention, examples of which are illustrated in the accompanying drawings.

Figure 1:
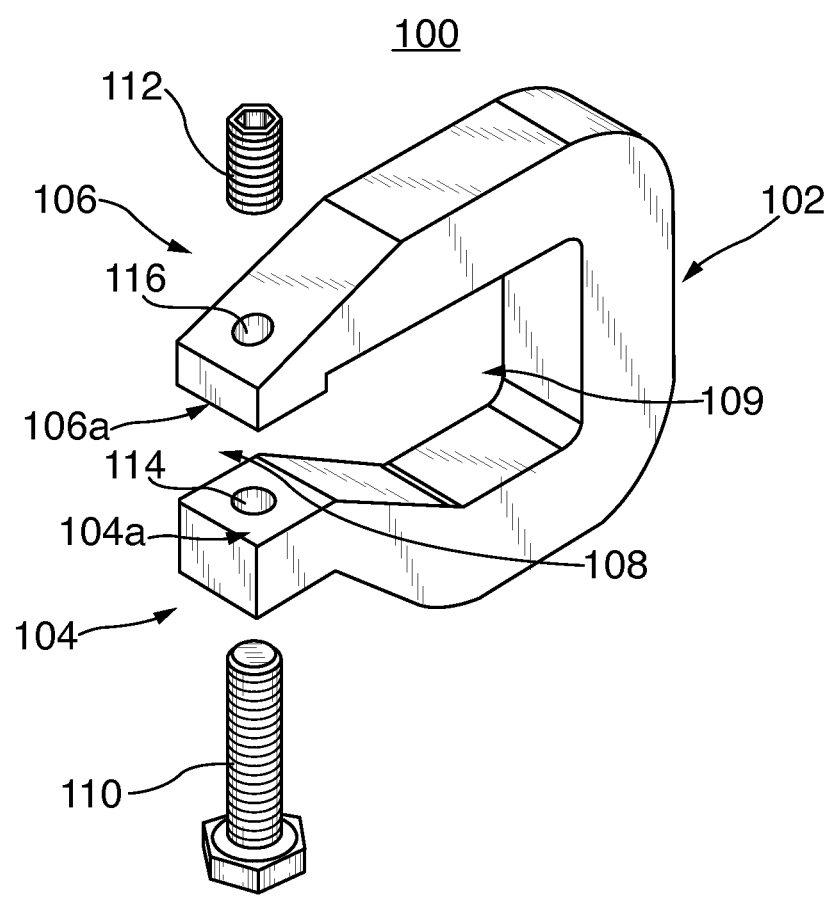
FIG. 1 shows a perspective view of a solar panel frame clamp, in accordance with some embodiments.

FIG. 1 shows a perspective view of a solar panel frame clamp 100 ("frame clamp 100") in accordance with some embodiments. Frame clamp 100 can include a clamp body 102, a set screw bolt 110, and a set screw 112. Frame clamp 100 may be used to clamp a solar panel frame to a purlin. For example, frame clamp 100 may be used to clamp a solar panel frame mounted to one or more mounting rails to a purlin of a carport or other solar power installation as discussed in more detail below with respect to FIGS. 3-5.

Clamp body 102 can be formed from any material (e.g., steel, stainless steel, aluminum, plastic, etc.) suitable for resiliently clamping one or more objects. According to some embodiments, clamp body 102 can be an electrically conductive material that facilitates electrical continuity through the solar panel racking system (e.g., for grounding purposes).

According to some embodiments, clamp body 102 can be a c-shaped member that includes a first end 104 and a second end 106 separated by an opening 108. First end 104 and second end 106 may be shaped to optimize a perpendicular clamping force on flat objects disposed within opening 108. Accordingly, first end 104 and second end 106 can have flat surfaces 104*a* and 106*a*, respectively, at least one of which may contact the clamped objects when frame clamp 100 is installed. In order to form flat surfaces 104*a* and 106*a*, one or both of first end 104 and a second end 106 may include a projecting arm. For example, as depicted in FIG. 1, first end 104 may include an arm projecting from clamp body 102 in a direction perpendicular to first threaded aperture 114, and second end 106 may include an arm projecting from clamp body 102 in a direction parallel with second threaded aperture 116. The shapes and sizes of such projecting arms may be chosen to accommodate particular objects to be clamped by frame clamp 100.

Furthermore, first end 104 and second end 106 can taper towards each other at distal ends of clamp body 102 to minimize the amount of space between flat surfaces 104*a* and 106*a* and the clamped objects while still allowing the clamped object to be disposed within opening 108. Tapering first end 104 and/or second end 106 towards one another can also serve to increase the space available within a void 109 defined by clamp body 102.

Objects to be clamped using frame clamp 100 (e.g., a purlin and/or a mounting rail) can be positioned in opening 108 and held together by tightening set screw bolt 110 and/or set screw 112 against the objects. Portions of the clamped objects may reside within a void 109 defined by clamp body 102. For example, if one or both of the objects to be clamped include a projecting feature, such as a lip or flange, for example, the feature(s) may be disposed within void 109 while keeping the size of opening 108 optimized for clamping.

Clamp body 102 can include a first threaded aperture 114 in first end 104 and a second threaded aperture 116 in second end 106. Threaded apertures 114 and 116 may be configured to threadably receive set screw 112 and set screw bolt 110, respectively, and/or other suitable fasteners or members as described below. The first end of clamp body 102 may be positioned adjacent to the purlin of the racking system such that first threaded aperture 114 is arranged perpendicularly to a surface of the purlin. The second end of clamp body 102 may be positioned adjacent to the mounting rail of the solar panel such that second threaded aperture 116 is arranged perpendicularly to a surface of the mounting rail.

Set screw bolt 110 may be provided for threadably engaging first threaded aperture 114. Set screw bolt 110 may be screwed into second threaded aperture 116 for clamping objects between first end 104 and second end 106. In particular, first end 104 can engage a mounting rail, and set screw bolt 110 can engage a purlin. Tightening set screw bolt 110 within second threaded aperture 116 can, therefore, securely clamp the mounting rail to the purlin. According to some embodiments, set screw bolt 110 can be formed from an electrically conductive material for providing electrical continuity throughout the solar panel installation (e.g., for grounding purposes).

Set screw 112 may be provided for threadably engaging first threaded aperture 114. In particular, set screw 112 may be screwed into first threaded aperture 114 to provide electrical continuity between the mounting rail of a solar panel and clamp body 102. Set screw 112, or another suitable replacement element, may pierce the mounting rail in order to achieve high-quality electrical continuity between the mounting rail and clamp body 102.

Figure 2:
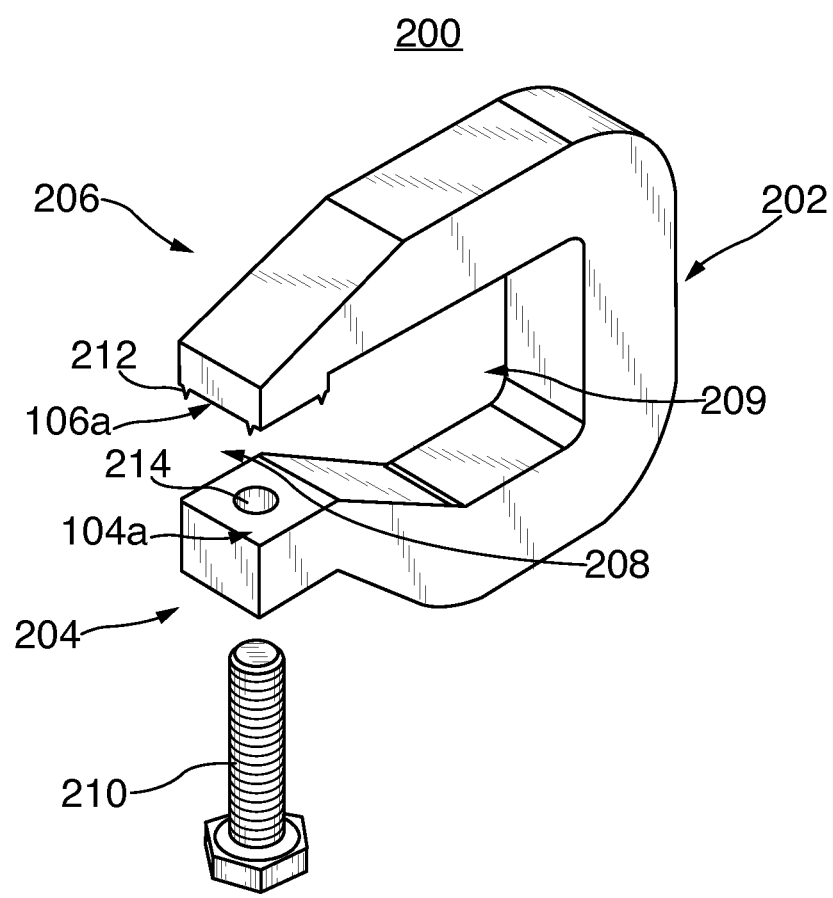
FIG. 2 shows a perspective view of another solar panel frame clamp, in accordance with some embodiments.

FIG. 2 shows a perspective view of a solar panel frame clamp 200 ("frame clamp 200") in accordance with some embodiments. Like frame clamp 100, frame clamp 200 can include a clamp body 202 and a set screw bolt 210. Rather than including a set screw, however, frame clamp 200 can include a continuity element 212. In particular, according to some embodiments, set screw 112 of FIG. 1 may be replaced with any suitable element that can pierce or otherwise enhance electrical continuity between frame clamp 200 and a mounting rail. For example, the set screw can be replaced with continuity element 212 that can be a single pin, a multi-pointed pin, or one or more bent members. As depicted in FIG. 2, continuity element 212 can be integrally formed with clamp body 202. In other embodiments, continuity element 212 may be securely fastened within an aperture (not shown) of clamp body 202 (e.g., first threaded aperture 114 or an unthreaded aperture) using any suitable method, including press-fitting, threadably engaging, or clipping continuity element 212 within an aperture of clamp body 202.

Figure 3:
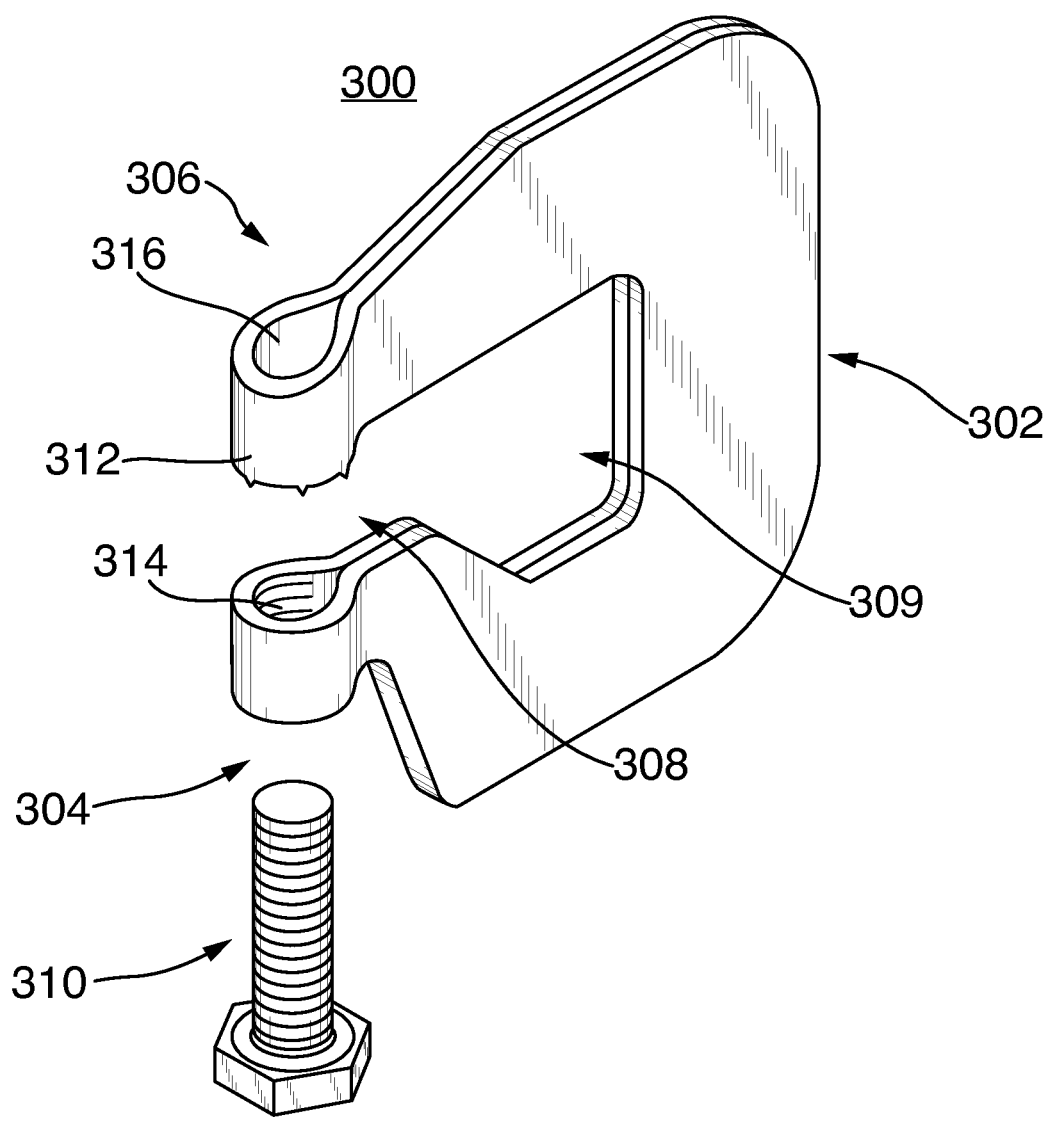
FIG. 3 shows a perspective view of yet another solar panel frame clamp, in accordance with some embodiments.

FIG. 3 shows a perspective view of a solar panel frame clamp 300 ("frame clamp 300") in accordance with some embodiments. Frame clamp 300 may be similar to frame clamp 200 of FIG. 2, except that clamp body 302 may be formed from stamped sheet metal (e.g., stainless steel) rather than being an extruded or machined element. Forming clamp body 302 from stamped sheet metal may be more resilient and cheaper to produce than clamp body 102 and clamp body 202 disclosed above. In addition to clamp body 302, frame clamp 300 can include a threaded aperture 314 formed in a first end 304, a continuity element 312 formed on a second end 306, and opening 308 to receive objects to be clamped, and a set screw bolt 310 configured to threadably engage threaded aperture 314.

Clamp body 302 may be folded from a flat portion of sheet metal before or after the sheet metal is stamped. Thus, according to some embodiments, clamp body 302 may be stamped from a flat portion of sheet metal and then folded to create clamp body 302. In other embodiments, a portion of sheet metal can be folded and then stamped to form clamp body 302. The stamping process can result in opening 308 being formed between first end 304 and second end 306 as well as a void 309 defined by clamp body 302 and in communication with opening 308. When folding the sheet metal to create clamp body 302, a cylindrical element may be placed at the fold axis in order to form threaded aperture 314 (and aperture 316, which may or may not be used according to various embodiments). The cylindrical element may be a stainless steel rod with a diameter equal to the desired diameter of threaded aperture 314, for example.

The threads of threaded aperture 314 may be formed at any time before or after clamp body 302 is stamped. Thus, in some embodiments, the threads of threaded aperture 314 can be machined directly on the sheet metal before stamping. In other embodiments, the threads may be formed (e.g., using a machining process) after clamp body 302 has been stamped and folded. In some embodiments, aperture 316 may also be threaded to receive a set screw similar to set screw 112 of FIG. 1. Frame clamp 300, therefore, could include a set screw instead of, or in addition to, continuity elements 312. Threads for aperture 316 may be created using a similar process to that used for threaded aperture 314.

Continuity elements 312 may be formed in second end 306 before or after clamp body 302 is folded. Continuity elements 312 are depicted as several pointed projections extending towards opening 308 from second end 306. Such elements may be easily formed during the stamping process if the stamping is conducted prior to folding clamp body 302. If continuity elements 312 are formed after clamp body 302 is folded, the elements may be more easily formed using a machining process.

Figure 4:
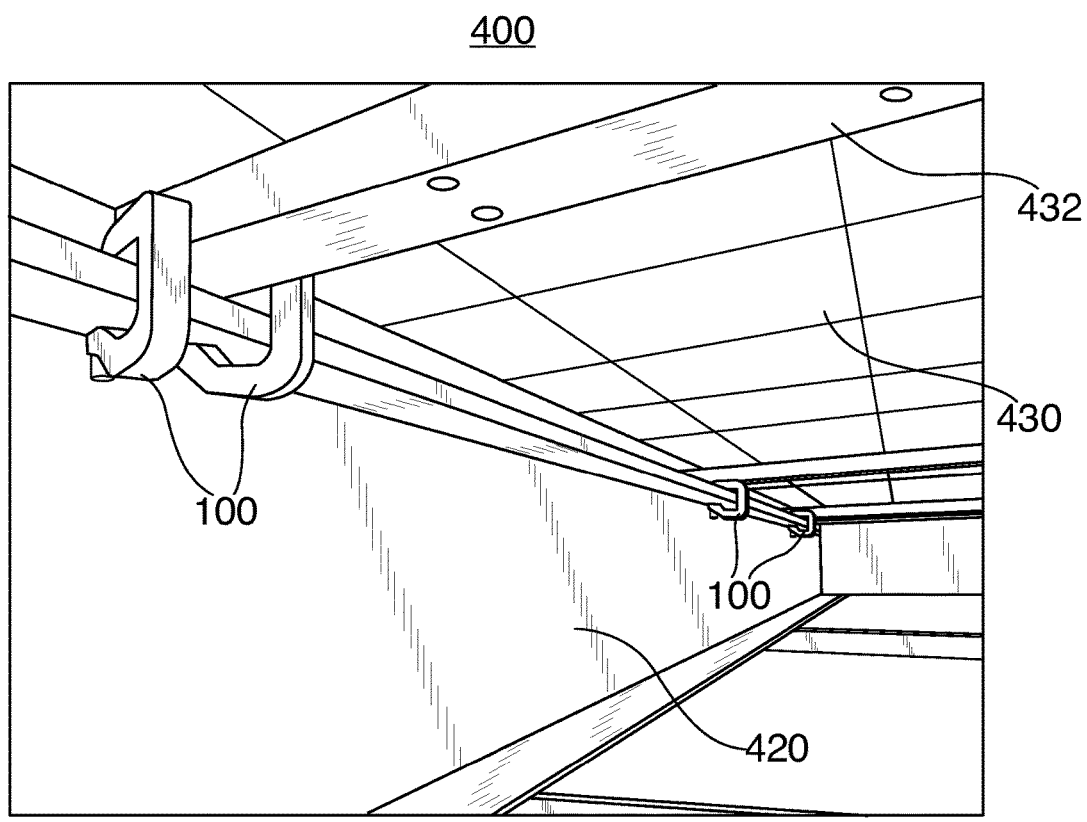
FIG. 4 shows a perspective view of a solar power system, in accordance with some embodiments.

FIG. 4 shows a perspective view of a solar power system 400 ("system 400"), in accordance with some embodiments. System 400 can include several frame clamps 100 that can clamp mounting rails 432 of solar panel 430 to a purlin 420 in accordance with some embodiments. Although system 400 is depicted as incorporating frame clamps 100, it should be understood that frame clamp 200 of FIG. 2 or frame clamp 300 of FIG. 3 may seamlessly replace (or be used in conjunction with) frame clamps 100.

According to some embodiments, mounting rails 432 may form part of the frame of solar panel 430. For example, laminate solar panels can be mounted to a frame that includes perimeter members (not shown) as well as mounting rails 432. In other embodiments, however, mounting rails 432 can be separate members that may be installed before being coupled to solar panel 430.

Solar panel 430 may include or be mounted to any suitable number of mounting rails 432 that provide adequate support for solar panel 430. In some embodiments, solar panel 430 can be mounted to two mounting rails 432. Mounting rails 432 may be roll-formed rails formed from any suitable material (e.g., steel or aluminum). In some embodiments, mounting rails 432 may be eye-bar shaped with two flanges in contact with purlin 420. Accordingly, and as depicted in FIG. 2, two frame clamps 100 can be employed to secure each mounting rail 432 to purlin 420 (i.e., one clamp for each flange).

Purlin 420 can also be a roll-formed rail member. Alternatively, purlin 420 can be a pipe or any other suitable member. In some embodiments, purlin 420 can be a part of a carport. Purlin 420 can be formed from any suitable material, (e.g., steel or aluminum). According to some embodiments both purlin 420 and mounting rails 432 may be electrically conductive in order to facilitate electrical continuity throughout system 200.

As depicted in FIG. 4, frame clamps 100 can secure solar panel 430 to purlin 420 from underneath and without engaging any perimeter edges of the solar panel frame. Accordingly, multiple frames can be mounted to a purlin without gaps between them, thus providing a waterproof canopy (e.g., for a carport).

Figure 5:
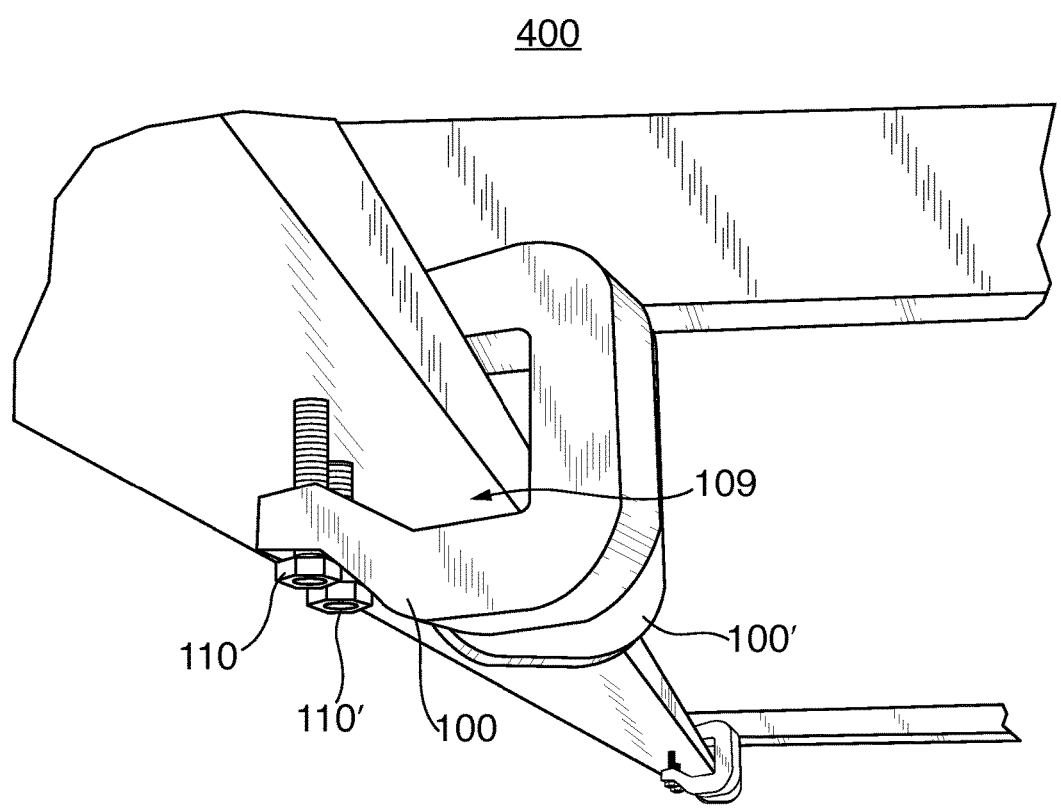
FIG. 5 shows another perspective view of the system of FIG. 4, in accordance with some embodiments.

FIG. 5 shows another perspective view of system 400, in accordance with some embodiments. In particular, FIG. 5 shows a detail view of frame clamps 100 and 100' clamping mounting rail 432 to purlin 420. Set screw bolts 110 and 110' may be threadably inserted into second threaded apertures (not visible in FIG. 3) and tightened such that their distal ends, opposite their heads, can engage a surface of purlin 420. As set screw bolts 110 and 110' are tightened, the second ends (e.g., including set screws and/or other continuity elements) of frame clamps 100 and 100' (not visible) can be pulled against the flanges (or other suitable surfaces) of mounting rail 432 thus clamping mounting rail 432 to purlin 420 between first ends 104 and 104' and set screw bolts 110 and 110'.

Figure 6:
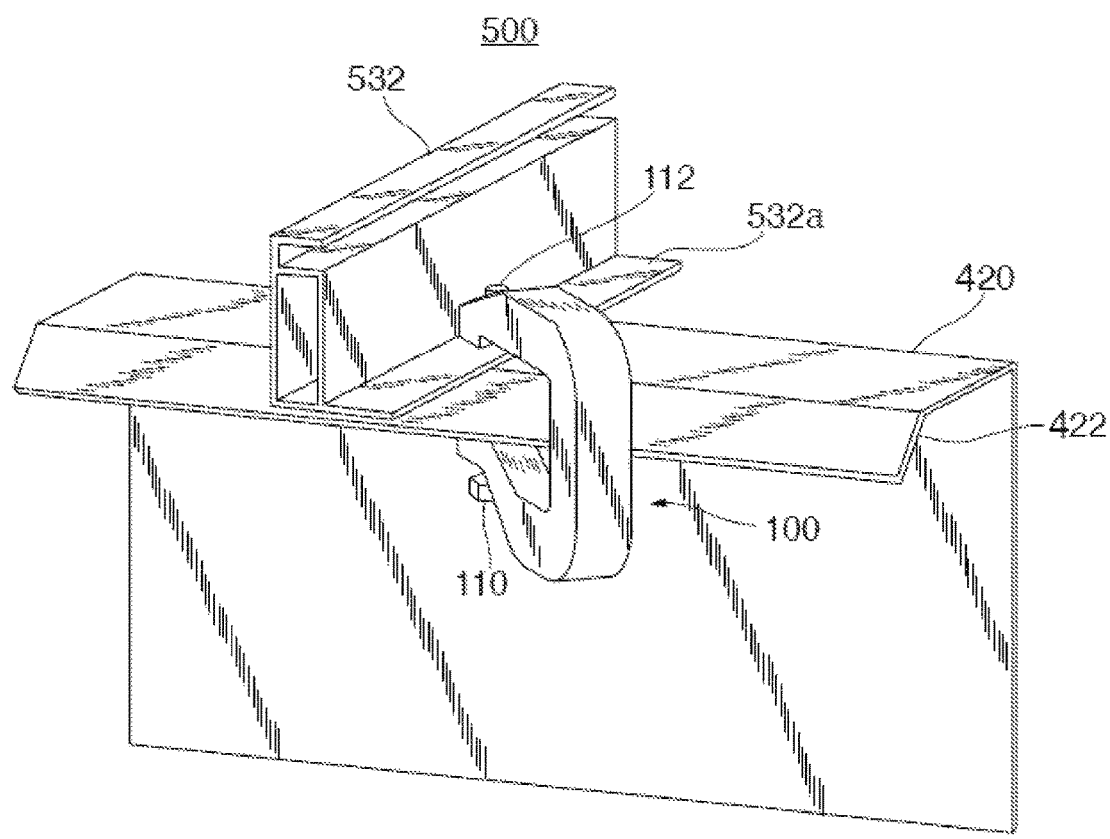
FIG. 6 shows a perspective view of another solar power system, in accordance with some embodiments.

Purlin 420 can include a lip 422 that prevents frame clamp 100 from sliding off of purlin 420 (see FIG. 6 for a more detailed view of the lip). During installation of frame clamp 100, lip 422 can be passed through opening 108 and disposed within void 109 defined by clamp body 102.

FIG. 6 shows a perspective view of another solar power system 500 ("system 500"), in accordance with some embodiments. System 500 can be similar to system 400 of FIGS. 4 and 5 except that mounting rail 532 can be an L shaped perimeter member of a solar module frame. That is, rather than the eye-bar shaped mounting rail that includes two flanges depicted in FIGS. 4 and 5, mounting rail 532 may include only flange 532a. It should be understood that in some embodiments, a solar power system can include a combination of mounting rails 532 as depicted in FIG. 6 as well as mounting rails 432 as depicted in FIGS. 4 and 5. That is, mounting rails 532 may be used as perimeter members of a solar module frame while mounting rails 432 may be used as reinforcing mounting rails that support interior sections of solar panels.

As described above, when set screw bolt 110 is tightened against purlin 420, second end 106 of frame clamp 100 can clamp down on flange 532a of mounting rail 532. Additionally, set screw 112 may be positioned within second threaded aperture 116 such that it makes first contact with mounting rail 532 as set screw bolt 110 is tightened. That is, set screw 112 may preset to extend beyond the flat surface of first second end 106 before frame clamp 100 is installed to function as a grounding pin for system 500. This arrangement can facilitate enhanced electrical continuity between mounting rail 532 and frame clamp 100. In other embodiments, frame clamp 100 can be installed first, and then set screw 112 can be tightened against mounting rail 532.

Figure 7:
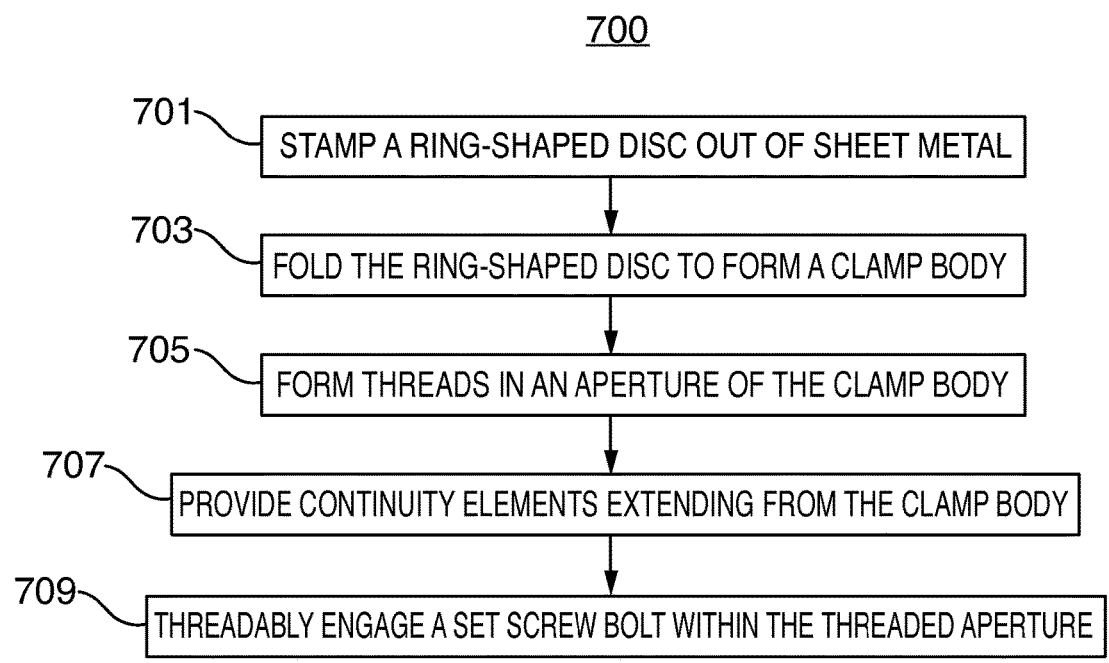
FIG. 7 shows a flowchart of an illustrative process for forming a frame clamp, in accordance with some embodiments.

FIG. 7 shows a flowchart of an illustrative process 700 for forming a frame clamp, in accordance with some embodiments. Process 700 can begin at step 701, in which a ring-shaped disc can be stamped out of sheet metal. The sheet metal may be, for example, a sheet of stainless steel. The ring-shaped disc stamped from the sheet metal can include a hole that will define an opening and a void (e.g., opening 308 and void 309 of FIG. 3) surrounded by material that will form a clamp body clamp body (e.g., clamp body 302 of FIG. 3) when the material is folded. The outer perimeters of the ring-shaped disc may suitably shaped to eventually form the desired shape of the clamp body after folding. Thus, the ring-shaped disc may not include any perfectly round features.

At step 703, the ring-shaped disc can be folded to create the clamp body. The clamp body may be a c-shaped element that may include a first end, a second end, an opening, a void, and at least one aperture (see, e.g., examples of such elements in frame clamp 300 of FIG. 3). A cylindrical element may be placed in the fold axis during the folding step to create the apertures.

At step 705, threads can be formed in at least one aperture of the clamp body using a machining process, for example. It should be understood that the threads can be cut into the clamp body at any time before or after the clamp body is stamped and/or folded. Thus, threads can be formed in the sheet metal prior to the ring-shaped disc being stamped, in the ring-shaped disc before it is folded, or at any time after the ring-shaped disc is folded into the clamp body.

At step 707, continuity elements can be formed on the clamp body. The continuity elements (e.g., continuity elements 312 of FIG. 3) can be any suitable elements for facilitating electrical continuity between the clamp body and one or more elements of a solar power system (e.g., mounting rails 432 of FIG. 4). The continuity elements may be shaped and formed of a material suitable to pierce and/or deform the one or more elements. For example, the continuity elements may include one or more pins extending from the second end of the clamp body into the opening. It should be understood that the continuity elements can be formed at any time during process 700. For example, the continuity elements can be formed during the stamping step (701) or at any other time (e.g., using a machining process).

In alternative embodiments, apertures at both first and second ends of the clamp body can be threaded, and a set screw (e.g., set screw 112 of FIG. 1) can be inserted into the second threaded aperture to facilitate electrical continuity.

At step 709, a set screw bolt can be threadably engaged within the threaded aperture. The set screw bolt (e.g., set screw bolt 310 of FIG. 3) may be tightened within the threaded aperture to clamp one or more objects between a distal end of the set screw bolt (opposite its head) and the continuity elements and/or set screw.

Figure 8:
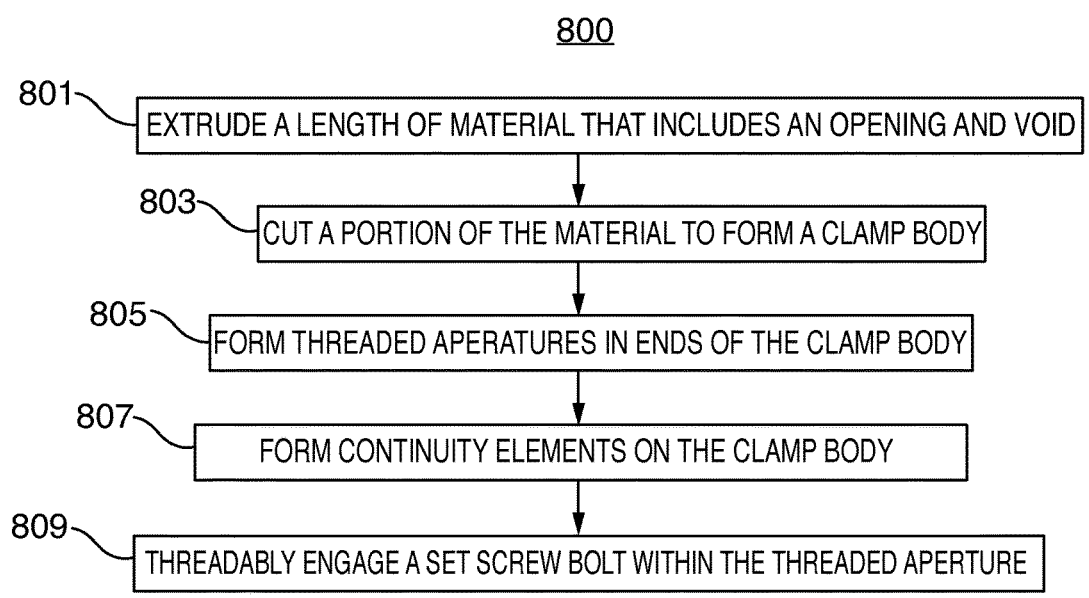
FIG. 8 shows a flowchart of an illustrative process for forming a frame clamp, in accordance with some embodiments.

FIG. 8 shows a flowchart of an illustrative process 800 for forming a frame clamp, in accordance with some embodiments. Process 800 can begin at step 801, in a length of material that includes a void and an opening in communication with the void can be extruded. The length of material may be, for example, aluminum or stainless steel. At step 803, a portion of the length of material can be cut off to form a clamp body (e.g., clamp body 102 of FIG. 1). The portion may be cut using any suitable cutting tool, such as a saw or a laser, for example.

At step 805, at least one threaded aperture (e.g., threaded apertures 114 and 116 of FIG. 1) can be formed in the clamp body using a machining process, for example. In some embodiments, only one threaded aperture (e.g., threaded aperture 214 of FIG. 2) may be formed during step 805. In these embodiments, process 800 can continue onto step 807, in which continuity elements can be formed on the clamp body. For example, continuity elements 212 can be formed (e.g., using a machining process) on a second end (e.g., second end 206 of FIG. 2) of the clamp body. As described above, the continuity elements (e.g., continuity elements 312 of FIG. 3) can be any suitable elements for facilitating electrical continuity between the clamp body and one or more elements of a solar power system (e.g., mounting rails 432 of FIG. 4). The continuity elements may be shaped and formed of a material suitable to pierce and/or deform the one or more elements. For example, the continuity elements may include one or more pins extending from the second end of the clamp body into the opening.

At step 809, a set screw bolt can be threadably engaged within the threaded aperture. The set screw bolt (e.g., set screw bolt 110 of FIG. 1) may be tightened within the threaded aperture to clamp one or more objects between a distal end of the set screw bolt (opposite its head) and the continuity elements and/or set screw.

While there have been described solar panel frame clamps, it is to be understood that many changes may be made therein without departing from the spirit and scope of the invention. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The described embodiments of the invention are presented for the purpose of illustration and not of limitation.

What is claimed is:

1. A solar panel system, comprising:
   a solar panel frame comprising a mounting rail;
   a purlin; and
   a frame clamp, comprising:
      a clamp body comprising a first end and a second end defining an opening therebetween;
      a threaded aperture extending through the first end in communication with the opening;
      a continuity element extending from the second end into the opening; and
      a bolt extending through the threaded aperture into the opening opposing the continuity element, wherein the continuity element comprises a set screw that extends into the opening and contacts the mounting rail before the second end contacts the mounting rail when the bolt is tightened.

2. The solar panel system of claim 1, further comprising a second frame clamp that clamps a second flange of the mounting rail to the purlin.

3. The solar panel system of claim 1, wherein:
   the bolt perpendicularly engages the purlin; and
   the continuity element perpendicularly engages a flange of the mounting rail.

4. The solar panel system of claim 3, wherein the bolt and the continuity element facilitate electrical continuity between the mounting rail and the purlin through the clamp body.

5. The solar panel system of claim 1, wherein the clamp body defines a void within the frame clamp and adjacent to the opening.

6. The solar panel system of claim 5, wherein at least one of the purlin and the mounting rail comprises an extending member disposed within the void.

7. The solar panel system of claim 1, wherein tightening the bolt causes the bolt to engage the purlin and pulls the second end against the mounting rail to clamp the mounting rail to the purlin.

8. The solar panel system of claim 1, wherein:
   the first end comprises a first arm projecting in a first direction, the first direction extending perpendicularly to the threaded aperture and obliquely from a contiguously formed portion of the first end; and
   a second arm projects from the second end in a second direction, the second direction extending parallel to a direction of extension of the continuity element.

9. The solar panel system of claim 1, wherein the first end and the second end comprise parallel flat surfaces that face each other.

10. The solar panel system of claim 1, wherein the first end and the second end taper towards each other.

11. The solar panel system of claim 1, wherein the clamp body comprises one of aluminum and stainless steel.

\* \* \* \* \*